United States Patent [19]

Buscall et al.

[11] Patent Number: 4,460,732

[45] Date of Patent: Jul. 17, 1984

[54] PARTICULATE DISPERSIONS

[75] Inventors: Richard Buscall; Terence Corner, both of Cheshire, England

[73] Assignee: Imperial Chemical Industries PLC, London, England

[21] Appl. No.: 505,325

[22] Filed: Jun. 17, 1983

[30] Foreign Application Priority Data

Jun. 22, 1982 [GB] United Kingdom ................. 8218012

[51] Int. Cl.$^3$ ............................................. C08F 20/00
[52] U.S. Cl. ..................................... 524/460; 524/458; 524/522; 524/556; 524/558; 8/557; 8/558
[58] Field of Search ............... 524/458, 460, 522, 556, 524/558, 547; 8/557, 558; 523/340, 342; 528/501

[56] References Cited

U.S. PATENT DOCUMENTS

| | | | |
|---|---|---|---|
| 2,930,775 | 3/1960 | Fordyce et al. ..................... | 524/108 |
| 3,092,600 | 6/1963 | Ozawa ................................. | 528/501 |
| 3,316,200 | 4/1967 | Hatala ................................. | 524/547 |
| 3,840,487 | 10/1974 | Dyson et al. ........................ | 524/316 |
| 4,058,499 | 11/1977 | Sekmakas et al. .................. | 524/522 |
| 4,255,308 | 3/1981 | Brasen ................................ | 524/522 |
| 4,312,795 | 1/1982 | Taguchi et al. ..................... | 524/522 |
| 4,373,054 | 2/1983 | Gibson et al. ...................... | 524/460 |

FOREIGN PATENT DOCUMENTS

| | | | |
|---|---|---|---|
| 701254 | 1/1965 | Canada ............................... | 524/522 |
| 7094013 | 3/1980 | Japan ................................. | 524/460 |
| 369915 | 3/1932 | United Kingdom ................ | 8/558 |

Primary Examiner—Paul R. Michl
Assistant Examiner—Alex H. Walker
Attorney, Agent, or Firm—Cushman, Darby & Cushman

[57] ABSTRACT

A dispersion in an aqueous medium of an organic particulate solid substantially all the particles of which have a size less than 100 microns which dispersion contains a polymeric composition which is soluble in the aqueous medium and which comprises a copolymer of at least one hydrophobic monomer as herein defined and at least one hydrophilic monomer as herein defined.

10 Claims, No Drawings

PARTICULATE DISPERSIONS

This invention relates to dispersions of solid organic particles in aqueous media, to the manufacture of such dispersions and to novel copolymers for use as dispersing agents therein.

It is already known that dispersions of particles of an inorganic solid in an aqueous medium, e.g. inorganic pigments in the preparation of emulsion paints, are often stabilised by the presence in the aqueous medium of a polyelectrolyte, e.g. a partially neutralised polymeric carboxylic acid.

It is already known to produce dispersions of solid organic particles in aqueous media with the aid of conventional dispersing agents such as sulphonated naphthalene-formaldehyde condensates, lignosulphonates, partially hydrolysed poly(vinyl acetate) or poly(ethylene oxide)-poly(propylene oxide) block copolymers.

Recently, it has been disclosed that by employing as dispersing agents a certain class of amphipathic copolymer it is possible to produce dispersions in aqueous media of organic solid particles which have higher disperse phase volume concentrations than attainable with conventional dispersing agents and which yet possess a high degree of fluidity. Such copolymers can be difficult to prepare.

In U.S. Pat. No. 2,930,775 it has been proposed to use alternating copolymers of maleic anhydride and diisobutylene as dispersing agents for the preparation of pigments, including organic pigment, pastes.

In U.S. Pat. No. 3,840,487 it has been proposed to use in the preparation of pigment, preferably inorganic pigment, pastes a dispersing agent which is an alkali metal or ammonium salt of a copolymer containing moieties of an unsaturated monocarboxylic acid of the formula:

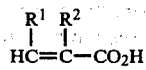

and moieties of an unsaturated carboxylic acid ester of the formula:

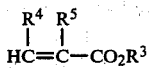

wherein $R^1$, $R^2$, $R^4$ and $R^5$, which may be the same or different, are hydrogen or methyl and $R^3$ is an alkyl group containing 1 to 8 carbon atoms.

We have now found that certain copolymers as hereinafter defined may be used to prepare dispersions of particles of organic solids in aqueous media which dispersions are often less viscous then dispersions prepared with conventional dispersing agents and may be able to withstand so-called harsh environments, e.g. high concentrations of ions in the aqueous medium or high temperature, with no undue tendency to flocculate.

Accordingly, the present invention provides a dispersion in an aqueous medium of an organic particulate solid substantially all the particles of which have a size less than 100 microns which dispersion contains a polymeric composition which is soluble in the aqueous medium characterised in that the polymeric composition comprises a copolymer of at least one hydrophobic monomer as hereinafter defined and at least one hydrophilic monomer as hereinafter defined.

Another aspect of the present invention provides a process for the production of a dispersion as hereinbefore defined which process comprises dispersing an organic solid in an aqueous medium in the form of particles substantially all of which are of a size less than 100 microns, in the presence in the aqueous medium of a polymeric composition characterised in that the polymeric composition comprises a copolymer of at least one hydrophobic monomer as hereinafter defined and at least one hydrophilic monomer as hereinafter defined.

By "hydrophobic monomer" we mean a monomer which (a) comprises a polymerisable olefinically unsaturated group,
(b) on polymerisation would be converted into a homopolymer which would be sufficiently hydrophobic to be insoluble in an aqueous medium in which a copolymer derived therefrom would be used in the present invention and
(c) is selected from (i) esters which are derived from polyalkylene oxides in which, at least where a substantial proportion of the alkylene residues are ethylene residues, there is a terminal hydrophobic group (i.e. $C_{8-30}$ alkyl, alkaryl or polycyclic hydrocarbyl group), or from so called Oxo-alcohols derived from, for example, polyisobutylene (e.g. of molecular weight 800–10,000) or from long chain alkanols having 10–30 carbon atoms, preferably 12–18 carbon atoms (e.g. lauryl, stearyl, and palmityl) or from aryl groups which may be mono- or polynuclear (e.g. phenyl, naphthyl and anthracyl) or from alkaryl e.g. t-butyl-phenyl or from aralkyl, e.g. benzyl, of acrylic or $C_{1-5}$-alkacrylic acids, e.g. methacrylic acid; (ii) vinyl esters of long chain alkanoic acids having 6–30 carbon atoms, preferably 10–20 carbon atoms, e.g. palmitic and stearic acids; (iii) alkyl, alkaryl, aralkyl or aryl esters of long chain olefinically unsaturated carboxylic acids having 6–30 carbon atoms, preferably 10–20 carbon atoms, e.g. oleic acid; (iv) vinyl aromatic compounds which may have one or more aromatic rings, e.g. styrene, α-methylstyrene, 1-vinyl-naphthalene and 9-vinyl-anthracene; (v) macromers, e.g. α-methyl-styrene macromer; (vi) N-alkyl, N-cycloalkyl, and N-aryl acrylamides and $C_{1-5}$-alkacrylamides wherein the N-alkyl group has up to six carbon atoms, e.g. N-tert-butyl acrylamide, N-cyclohexyl methacrylamide and N-naphthylacrylamide; and (viii) vinyl ethers, e.g. vinyl butyl ether.

As specific examples of preferred hydrophobic monomers may be mentioned lauryl methacrylate, vinyl stearate, α-methylstyrene, α-methyl-styrene macromer (typically of molecular weight about 1200), 2-vinyl naphthalene, and 1- and 2-naphthyl methacrylate.

By "hydrophilic monomer" we mean a monomer which comprises a polymerisable olefinically unsaturated group and which on polymerisation would be converted into a homopolymer which would be sufficiently hydrophilic to be soluble in an aqueous medium in which a copolymer derived therefrom would be used in the present invention.

A further aspect of the present invention provides a polymeric composition which comprises a copolymer prepared from at least one hydrophobic monomer and at least one hydrophilic monomer characterised in that the at least one hydrophobic monomer comprises an aryl ester of an acrylic or $C_{1-5}$-alkacrylic acid, a vinyl ester of a $C_{6-30}$-alkanoic acid, a vinyl aromatic compound or a macromer derived therefrom, or an alkyl, aryl, alkaryl or aralkyl ester of an olefinically unsaturated $C_{6-30}$-carboxylic acid.

By "macromer" we mean a vinyl-ended polymer which is derived from a hydrophobic monomer as hereinbefore defined and which has a molecular weight of less than 5000, preferably less than 2000.

"Soluble" and "insoluble" where used herein are to be understood as having their ordinary practical meanings.

Whilst we do not exclude the possibility that the at least one hydrophilic monomer which is present in the copolymer used in the present invention may be nonionic, for example it may comprise an organic compound with a suitable polar group attached thereto, e.g. 2-hydroxyethyl methacrylate and N-vinyl pyrrolidone, it is preferably ionic.

As examples of suitable ionic hydrophilic monomers may be mentioned amphoteric monomers, e.g. 1-vinyl-3-(3-sulphopropyl) imidazolium hydroxide inner salt and N-acyl-α-amino-acrylic acid; and monomers which are at least potentially cationic, by which we mean that at least under conditions of low pH they are present in the form of cations, for example aminoalkanol esters of unsaturated carboxylic acids, e.g. 2-amino-ethyl methacrylate hydrochloride, and N,N-dimethylamino-ethyl methacrylate hydrochloride, aminoamides of unsaturated carboxylic acids, e.g. N-(N',N'-dimethyl-)aminomethylacrylamide and 2-aminoethyl acrylamide, and vinyl amides, e.g. vinyl-benzylamine and 2- and 4-vinylpyridines.

Preferably, however, the at least one hydrophilic monomer contains an anionic group, i.e. it contains an acidic group and/or a salt thereof. The acidic group is peferably a carboxylic acid group, or a sulphonic acid group. Where the at least one hydrophilic monomer comprises a salt of an acid, whilst we do not exclude the possibility that the cation associated therewith may be derived from an organic base, the cation is preferably derived from an inorganic base, e.g. ammonia, and more preferably from a metal of Group IA of the Periodic Table of Elements, e.g. sodium.

It will be appreciated that where acidic and salt groups are present in the copolymer used in the present invention the ratio of acidic to salt groups may vary within wide limits such that the composition of the hydrophilic component of the copolymer may be in the range from 0% acidic groups and 100% salt groups to 100% acidic groups and 0% salt groups.

The polymerisable olefinically unsaturated carboxylic acids and salts thereof which may provide the at least one hydrophilic monomer of the copolymer used in the present invention contain at least one activated carbon-carbon double bond and at least one carboxyl group, that is, an acid containing an olefinic double bond which polymerises because of its position in the monomer molecule either in the alpha-beta position with respect to the carboxyl group or as part of a terminal methylene group, i.e. $CH_2=C<$. As examples of such carboxylic acids and salts may be mentioned acrylic acid, methacrylic acid, ethacrylic acid, alpha-chloroacrylic acid, alpha-cyano-acrylic acid, beta-methyl-acrylic acid (crotonic acid), alpha-phenyl-acrylic acid, beta-acryloxy-propionic acid, sorbic acid, alpha-chloro-sorbic acid, angelic acid, cinnamic acid, p-chloro-cinnimic acid, beta-styrylacrylic acid, itaconic acid, maleic acid, fumaric acid and tricarboxy-ethylene.

The preferred polymerisable olefinically unsaturated carboxylic acids are the mono-olefinic carboxylic acids having the general structure

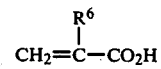

wherein $R^6$ is a substituent selected from the class consisting of hydrogen, halogen, cyano, alkyl, aryl, aralkyl, alkaryl, or cycloaliphatic groups. Preferably $R^6$ is hydrogen or methyl, and more preferably is hydrogen.

As examples of polymerisable olefinically unsaturated sulphonic acids and salts thereof which may provide the at least one hydrophilic monomer of the copolymer used in the present invention may be mentioned inter alia 2-acrylamido-2-methylpropanesulphonic acid, ethylene-sulphonic acid, allylsulphonic acid, styrenesulphonic acid and 2-sulphoethyl methacrylate.

Where the aqueous medium which is used in the present invention is ionic and contains divalent ions, e.g. calcium or magnesium ions, the at least one hydrophilic monomer preferably comprises a polymerisable olefinically unsaturated carboxylic acid and a polymerisable olefinically unsaturated sulphonic acid; in the absence of a sulphonic acid there is often a tendency for precipitation to occur. Where the at least one hydrophilic monomer comprises a carboxylic acid and a sulphonic acid the weight ratio of carboxylic acid to sulphonic acid is preferably in the range 2:1 to 30:1, particularly preferably in the range 6:1 to 10:1, and more particularly preferably the carboxylic acid is acrylic acid and the sulphonic acid is 2-acrylamido-2-methylpropanesulphonic acid.

It will be appreciated that where the at least one hydrophilic monomer contains a basic or acidic group the solubility of a copolymer prepared therefrom will depend on the pH of the aqueous medium in which is to be used.

Preferably the at least one hydrophobic monomer provides less than 30%, particularly preferably less than 20% and more particularly preferably between 1 and 10% by weight of the monomers used in the preparation of the copolymer used in the present invention.

Preferably the at least one hydrophilic monomer provides more than 70%, particularly preferably more than 80% and more particularly preferably between 90 and 99% by weight of the monomers used in the preparation of the copolymer used in the present invention.

There are generally no further improvements in the dispersion of the present invention when more than 30% by weight and often when more than 20% by weight, of the at least one hydrophobic monomer is present in the monomer mixture used in the preparation of the copolymer used as the dispersing agent in the dispersion.

The molecular weights of the copolymers used in the present invention are preferably in the range 10,000 to 100000 and more preferably in the range 10,000 to 50,000.

Organic particulate solids suitable for incorporation in a dispersion according to the present invention may be of many different types. They may be polymeric, for example substantially hydrocarbon polymers, e.g. polystyrene, or polymers containing polar groups, e.g. polyvinyl chloride, polymethyl methacrylate acrylic copolymer latices. They may comprise particles of biologically active organic solids, in particular pesticides such as fungicides, insecticides, bactericides and herbicides, which are commonly used in the form of dispersions or suspensions in water and are frequently applied by spray. Examples of suitable fungicides include ethirimol, maneb, difolatan and triadimefon. Examples of suitable insecticides include BHC, DDT, carbaryl and diphenylamine derivatives known for use as acaricides. Examples of suitable bactericides include BHA, BHT and salicylanilide derivatives. Examples of herbicides include atrazines, linuron, monolinuron, diuron, MCPA and 2:4—D free acid.

However, in a preferred embodiment of the present invention the organic particulate solid comprises an organic pigment or preferably an organic dye. Preferably the dye is a reactive dye as defined in the Colour Index, and more preferably is a reactive dye based on the chlor-triazine group, although we do not exclude the possibility that the dye may be selected from any of the known classes of dyes, e.g. a disperse dye. We have found that dispersions of organic pigments of dyes, particularly where the organic particulate solid is a reactive dye, of high dispersed solids content in high ionic strength aqueous media are relatively low viscosity fluids with good mobility properties and can be converted by drying, for example spray drying, into good quality dried powders.

A yet further aspect of the present invention provides a dispersion of an organic pigment or dye as a fluid paste of high solids content containing one or more dispersing agents at least one of which is a copolymr as hereinbefore defined.

A yet further aspect of the present invention provides a dispersion of a reactive dye as a fluid paste of high solids content in an aqueous medium of high ionic concentration containing one or more dispersing agents at least one of which is a copolymer as hereinbefore defined.

A further aspect of the present invention provides a process for the production of a free-flowing powder which comprises an organic pigment or dye which process comprises at least the step of evaporating to dryness a dispersion of the organic pigment or dye in an aqueous medium containing as dispersing agent a copolymer which comprises moieties from at least one hydrophobic monomer and at least one hydrophilic monomer.

It will be appreciated that an organic solid to be dispersed in a dispersion of the present invention may contain polar groups, e.g. $-SO_3-$ or $-NH_2$, which may undergo an undesirable interaction with the hydrophilic component of a copolymer used in the present invention, for example they may form a precipitate. Accordingly, the copolymer will be selected such that the hydrophilic portion thereof does not interact unduly adversely with the organic solid which is to be dispersed. Simple experimentation will indicate a suitable organic solid/copolymer combination.

As examples of aqueous media which may be used in the present invention may be mentioned water, and solutions of one or more solids in water. Where a solution is used the one or more solids may comprise a suitable electrolyte which may be, for example, an inorganic salt or an organic salt. Typical inorganic salts include inter alia halides, e.g. chlorides, sulphates, nitrates and phosphates, of metals of Group IA and IIA of the Periodic Table of Elements, e.g. sodium and calcium respectively. Typical organic salts include inter alia carboxylates. Where the organic particulate material is a reactive dye the aqueous medium may comprise an aqueous solution of the reactive dye and a simple inorganic salt which is generated during manufacture of the dye.

Where the aqueous medium is a solution the concentration thereof may lie within wide limits. For example, where the solution is ionic the concentration of a suitable electrolyte may be up to or include concentrations which give saturated solutions of electrolyte. Where the organic particulate solid is a reactive dye and the electrolyte is sodium chloride the concentration of the electrolyte is typically between 5 and 15%. Where it is highly concentrated, e.g. it has an ionic concentration of several molar, or is saturated, e.g. with sodium chloride or calcium chloride, it is often preferred that the at least one hydrophilic monomer comprises one or more sulphonic acids, more preferably 2-acrylamido-2-methylpropane-sulphonic acid.

The pH of the dispersions of the present invention may lie within wide limits depending inter alia on the temperature thereof and the components of the dispersion. For example, where the aqueous medium is a saturated sodium chloride solution, the hydrophilic portion of the copolymer is provided by acrylic acid, and the temperature is between 0° C. and 95° C. the pH lies in the range 5–12; where the aqueous medium is a saturated calcium chloride solution, the hydrophilic portion of the copolymer is provided by 2-acrylamido 2-methylpropanesulphonic acid, and the temperature is between 0° C. and 95° C. the pH lies in the range 2–12; and where the aqueous medium is 1.5M calcium chloride, the hydrophilic portion of the copolymer is provided by acrylic acid and acrylamido-2-methylpropanesulphonic acid in a weight ratio of 9:1, and the temperature is about 25° C. and the pH lies in the range 5–12.

As already stated, the solid particles present in the dispersions of the present invention are of a size less than 100 microns. Within this limitation, it is possible for the particles to have a wide variety of average sizes and of size distributions. Thus the particles may range in size from 0.1 microns up to 100 microns, but in most cases a size range of from 0.1 to 1 micron, or possibly from 0.1 to 20 microns, depending on the intended end-use of the dispersion, will be appropriate.

The organic particulate solid may if desired be brought to the required particle size and size distribution prior to its incorporation into the aqueous medium in the presence of the copolymer; in other words, the process of the invention will in such instances involve merely a re-dispersion in the aqueous medium of aggregated material already having the appropriate primary particle size. For this purpose the particles may be prepared in many different ways, for example by the milling or bulk material employing any of the processes conventionally used for the production of finely divided substances such as pigments; suitable processes include ball milling, bead milling, sand milling, pug milling, ultrasonic treatment and subjection to high shear.

Alternatively, and in many cases more conveniently, particles of the organic solid of the required size and size distribution may be produced in situ by, for example, the comminution of coarse particles of the solid in the presence of the aqueous medium and the copolymer or by precipitation. Such coarser particulate material, where present, may be produced by for example, the spray drying of a solution or dispersion of the material in a liquid, crystallisation of the material from solution, or precipitation of the material from solution by the addition of a non-solvent. The subsequent comminution, or reduction in particle size, may be achieved by subjecting the blend of the coarse particles, the aqueous medium and the copolymer to any of the milling or allied procedures referred to above.

The aqueous medium in which the dispersed particles are dispersed may consist of water alone, or it may consist of water together with minor proportions (i.e., in general, less than 50%) of other water-miscible or water-soluble organic or inorganic substances.

The proportion of the copolymer used in a dispersion according to the present invention may vary according to the nature of the organic particulate solid and of the aqueous medium in which it is dispersed but proportions of from 0.5% to 10%, based on the weight of the particles, will suffice to give dispersions of acceptable stability in a majority of cases.

We do not exclude the possibility that a conventional dispersing agent may be present in a dispersion according to the present invention. For example, where the organic particulate solid is a disperse dye a conventional dispersing agent may be present such that the copolymer may be regarded as a supplement thereto.

The copolymers for use in a dispersion according to the present invention may be prepared by routes which will be apparent to those skilled in the polymer art. Typically, they may be prepared by free radical initiated polymerisation, which often provides a substantially random copolymer. The molecular weight of the product may be controlled by known techniques, e.g. varying the amount of polymerisation initiator and selecting a method of addition of the reagents to yield a polymer product of the desired molecular weight. The selected mixture of monomers may be dispersed in an aqueous solution which may contain a cosolvent for dispersing the at least one hydrophobic monomer.

It will be appreciated that where the copolymer comprises an acid and an ester thereof the copolymer may be prepared by partial hydrolysis of the corresponding homopolymer.

All references herein to the Periodic Table of Elements are to the version of the Periodic Table of Elements in "Advanced Inorganic Chemistry", by F. A. Cotton and G. A. Wilkinson, Third Edition, Interscience Publishers, 1972.

All references herein to the Colour Index are to the "Colour Index" published by the Society of Dyers and Colourists, Third Edition (Second Revision 1982).

The invention will be further described by reference to the following examples which are illustrative of the invention.

EXAMPLES 1–11

These Examples illustrate the preparation of copolymers for use as dispersing agents in the present invention.

General Procedure

A solution of one or more suitable hydrophobic monomers, one or more suitable hydrophilic monomers and azoisobutyronitrile (2.5 grams) in industrial methylated spirits (I.M.S., 250 $cms^3$) was added over 6 hours to distilled I.M.S., (750 $cms^3$) at reflux with stirring under a nitrogen purge. After completion of the addition the reaction mixture was refluxed until the residual monomer concentration was reduced to less than 0.25% of its initial value as determined by the method of Mino et al, Journal of Polymer Science, 1959, Volume 38, page 393. Water was added to the reaction mixture which was then azeotroped to remove alcohol, and neutralised slowly with an aqueous solution of sodium hydroxide (not Example 12), to leave a copolymer or terpolymer as a 20% w/w aqueous solution.

The percentages by weight of the hydrophilic and hydrophobic monomers used in the Examples are shown in Table 1.

TABLE 1

| | Hydrophobic monomer | | | Hydrophilic monomer | | | |
|---|---|---|---|---|---|---|---|
| Ex. No. | Lauryl methacrylate (% w/w) | α-Methyl styrene (% w/w) | Vinyl stearate (% w/w) | Acrylic acid (% w/w) | Methacrylic acid (% w/w) | AMPS[a] (% w/w) | DMAEM[b] (% w/w) |
| 1 | 1 | 0 | 0 | 99 | 0 | 0 | 0 |
| 2 | 2 | 0 | 0 | 98 | 0 | 0 | 0 |
| 3 | 5 | 0 | 0 | 95 | 0 | 0 | 0 |
| 4 | 10 | 0 | 0 | 90 | 0 | 0 | 0 |
| 5 | 20 | 0 | 0 | 80 | 0 | 0 | 0 |
| 6 | 30 | 0 | 0 | 70 | 0 | 0 | 0 |
| 7 | 0 | 5 | 0 | 95 | 0 | 0 | 0 |
| 8 | 0 | 10 | 0 | 90 | 0 | 0 | 0 |
| 9 | 0 | 0 | 10 | 90 | 0 | 0 | 0 |
| 10 | 10 | 0 | 0 | 0 | 90 | 0 | 0 |
| 11 | 10 | 0 | 0 | 80 | 0 | 10 | 0 |
| 12 | 10 | 0 | 0 | 0 | 0 | 0 | 90 |

[a] 2-Acrylamido-2-methyl-propanesulphonic acid.
[b] Dimethylaminoethyl methacrylate.

EXAMPLES 13–16

These Examples illustrate the preparation of copolymers for use as dispersing agents in the present invention.

A solution of acrylic acid (x pts), a vinyl-ended α-methylstyrene macromer (y pts) with a number average molecular weight of 1200 [prepared by the procedure described in Colloids and Surfaces, Volume 5, page 187, (1982)], where x+y=20 g, and azo-bisisobutyronitrile (ADIB) (0.2 g) in a mixture of toluene (22 $cm^3$) and distilled IMS (39 $cm^3$) was heated to 75°–80° C. for 72 hours; a further aliquot ADIB (0.1 g) was added after 24 hours. The solution was then evaporated to dryness and the copolymer dissolved in dioxane. Water was added to the dioxane solution and the dioxane removed by azeotroping to yield an aqueous copolymer solution. Before use this was neutralised with sodium hydroxide.

The percentages by weight of the monomers used in the Examples are shown in Table 2.

TABLE 2

| Example No. | α-methyl-styrene macromer (% w/w) | Acrylic Acid (% w/w) |
|---|---|---|
| 13 | 1.25 | 98.75 |
| 14 | 2.50 | 97.5 |
| 15 | 5.0 | 95.0 |
| 16 | 10.0 | 90.0 |

EXAMPLES 17–19

These Examples illustrate the preparation of copolymers suitable for use in the present invention.

A solution of acrylic acid (92 g), a suitable hydrophobic monomer (8 g) and azobisisobutyro nitrile (1.0 g) is degassed dimethyl formamide (300 cm$^3$) was stirred, under $N_2$ for 10 days at 60° C. after which it was poured into a mixture of diethyl ether (1500 cm$^3$) and cyclohexane (250 cm$^3$) to yield a sticky precipitate. The resultant mixture was stirred for several hours to remove any unreacted monomers and then the supernatant was poured off and the precipitate washed with a further aliquot diethyl ether. Finally, the precipitate was dissolved in methanol after which water was added and the methanol removed by distillation to yield an aqueous solution of an acrylic acid copolymer.

In Example 17 the hydrophobic monomer was 2-vinyl-naphthalene and the conversion of monomers to copolymer was 93% w/w.

In Example 18 the hydrophobic monomer was 1-naphthyl methacrylate and the conversion of monomers to copolymer was 87% w/w.

In Example 19 the hydrophobic monomer was 2-naphthyl methacrylate and the conversion of monomers to copolymer was 85%.

EXAMPLE 20

This Example illustrates the preparation of a copolymer for use in the present invention.

A mixture of 2-acrylamido-2-methylpropanesulphonic acid (18 grams), lauryl methacrylate (2 grams), water (1.5 grams), acetone (65 grams) and azobiscyanovaleric acid (0.25 grams) was degassed and then refluxed under nitrogen for 24 hours. The reaction mixture was worked up as in Example 1 to leave a copolymer of the sodium salt of 2-acrylamido-2-methylpropanesulphonic acid and lauryl methacrylate as a 20% w/w aqueous solution.

EXAMPLES 21–38

These Examples illustrate stable dispersions of polystyrene according to the present invention.

A sample of an aqueous solution of a copolymer, prepared as indicated in Table 3, was added to a charge stabilised polystyrene latex in 10$^{-2}$M sodium chloride solution (prepared by the method of Ottewill and Shaw, Kolloid-Zeitschrift und Zeitschrift fur Polymere, Band 215, Heft 2) to give a weight ratio of copolymer to polystyrene of 1:20. Sodium chloride was added until a saturated solution of sodium chloride was obtained; the polystyrene latex did not flocculate.

In a comparative test in the absence of the copolymer, flocculation occurred when the concentration of sodium chloride reached about 0.2 moles/dm$^3$.

TABLE 3

| Example No. | Copolymer Solution Prepared in Example No. |
|---|---|
| 21–24 | 1–4 |
| 25–38 | 7–20 |

EXAMPLES 37–51

These Examples illustrate stable dispersions of a range of polymers according to the present invention.

A sample of an aqueous solution of a copolymer, prepared as indicated in Table 4, was neutralised with dilute sodium hydroxide solution and added to a polymer latex to give a weight ratio of copolymer to polymer of 1:20. Sodium chloride was added until a saturated solution of sodium chloride was obtained; the polymer latex did not precipitate.

In a comparative test in the absence of the copolymer, flocculation occurred when the concentration of sodium chloride reached 0.1–0.2 moles/dm$^3$.

TABLE 4

| Example No. | Copolymer Solution Prepared in Example No. | Polymer Latex |
|---|---|---|
| 39 | 4 | A |
| 40 | 4 | B |
| 41 | 4 | C |
| 42 | 4 | D |
| 43 | 4 | E |
| 44 | 8 | A |
| 45 | 8 | B |
| 46 | 8 | C |
| 47 | 8 | D |
| 48 | 8 | E |
| 49 | 16 | A |
| 50 | 16 | B |
| 51 | 16 | C |
| 52 | 16 | D |
| 53 | 16 | A |

A: A polyvinyl chloride latex prepared by conventional emulsion polymerisation techniques using ammonium persulphate as initiator and an ammonium salt of a fatty acid as an emulsifier.
B: A poly(t-butylstyrene) latex prepared by conventional emulsion polymerisation in a 4:1 v/v mixture of water and acetone using Manoxol OT as emulsifier and ammonium persulphate as initiator.
C: A poly(vinyl chloride/vinylidene dichloride/acrylic acid/2-ethylhexylacrylate) latex prepared as described in Example 1 of U.S. Pat. No. 4,341,679.
D: A poly(methyl methacrylate) latex prepared by conventional emulsion polymerisation techniques using ammonium persulphate as initiator and a polyethylene glycol mono-oleate as emulsifier.
E: A poly(methyl methacrylate/2-ethylhexyl acrylate) latex prepared under the conditions described in D.

EXAMPLE 54

This Example illustrates the stability of a dispersion according to the present invention in the presence of calcium chloride.

A sample of the aqueous solution of the copolymer prepared in Example 11 was added to a charge stabilised polystyrene latex, as described in Example 21, in 10$^{-2}$M sodium chloride solution to give a weight ratio of copolymer to polystyrene of 1:20. Calcium chloride was then added until a saturated solution of calcium chloride was obtained; the polystyrene latex did not flocculate.

In a comparative test in the absence of the copolymer, flocculation occurred when the concentration of calcium chloride reached about 0.01 moles/dm$^3$.

EXAMPLE 55

This Example illustrates a dispersion of a fungicide according to the present invention.

A 71% v/v paste of technical grade 5-butyl-2-ethylamino-6-methylpyrimid-4-ol (Ethirimol, ex ICI, UK Pat. No. 1,182,584) in water was blended in a high speed mixer with various dispersing agents to give 50% v/v dispersions containing 1% w/w agent on Ethirimol. The dispersions were then transferred to a continuous beadmill with a throughput of 5.7 liters/hour and an average residence time of 5–10 minutes. The volume ratio of dispersion to beads used was 5:7 and the rotor tip-speed was 15 meters/second. After allowing the dispersions so treated to stand for 24 hours with gentle agitation to allow air bubbles to escape, the viscosity of the dispersion were measured at various dispersed solids concentrations using a Haake "Rotovisko" at 56 sec$^{-1}$.

The results are shown in Table 5.

In comparative tests using conventional dispersing agents, namely Pluronic P75 (ex Ugine-Kuhlman) at 2% w/w based on erithimol and a combination of partially hydrolysed polyvinyl acetate (ex Fluka A.G., molecular weight 15000, degree of hydrolysis 86–89%) and sodium dodecyl-benzene sulphonate, each at 2% w/w based erithimol, the viscosities of the mixtures were too high to measure in the Rotovisko.

TABLE 5

| % v/v Erithimol in dispersion | Dispersing Agent (Prepared Example No.) | Viscosity (Centipoise) |
|---|---|---|
| 35 | 6 | 19 |
| 35 | 5 | 14 |
| 35 | 4 | 22 |
| 40 | 6 | 36 |
| 40 | 5 | 20 |
| 40 | 4 | 34 |
| 45 | 6 | 68 |
| 45 | 5 | 43 |
| 45 | 4 | 56 |
| 50 | 6 | 160 |
| 50 | 5 | 92 |
| 50 | 4 | 95 |
| 55 | 6 | — |
| 55 | 5 | 235 |
| 55 | 4 | 180 |

EXAMPLES 56–59

These Examples illustrate dispersions of an organic pigment according to the present invention.

Polychlorocopper phthalocyanine C.I. Pigment Green 7 pastes were stirred in a high speed, low-shear stirrer for five minutes with a range of dispersing agents to give very fluid, readily pourable dispersions.

In comparative test, using water instead of the dispersing agents, thick non-pourable pastes were produced.

Details of the Examples are given in Table 6.

TABLE 6

| | | Dispersing Agent[a] | | |
|---|---|---|---|---|
| | | | Solution in Water | |
| Example No. | C.I. Pigment Green 7 Paste | Prepared in Example No. | Concentration of Solution (% w/w) | Weight of Solution (grams) | Water (grams) |
|---|---|---|---|---|---|
| 56 | A | 4 | 6.9 | 26.19 | 0 |
| 57 | A | 4 | 6.9 | 7.25 | 18.94 |
| C.T. | A | | | | 26.19 |
| 58 | B | 5 | 10 | 10 | 41.6 |
| 59 | B | 5 | 10 | 20 | 31.6 |
| C.T. | B | | | | 51.6 |

A: 83.81 grams of a 42% w/w press paste.
B: 48.4 grams of 64% w/w press paste.
C.T.: Comparative test.
[a]As sodium salt.

EXAMPLES 60–62

These Examples illustrate dispersions of a reactive dye according to the present invention.

200 gram samples of slurries containing 25.2 grams of colour were prepared by mixing 115.66 grams of a press paste (21.8% w/w colour and 17.5% NaCl) of Reactive Orange 12 as defined in the Colour Index, a portion of the copolymer prepared in Example 4, water, and sodium chloride. The pH of the slurries was adjusted to 8.5–9.0 with dilute sodium hydroxide solution.

The slurries were treated in a Waring blender at half-speed for 30 seconds and then at full speed for 60 seconds. The viscosities of the dispersions so obtained were measured using a Deer Rheometer with small cylinders at 25° C. and at a shear rate of 54 seconds$^{-1}$.

The results are shown in Table 7 and show a significant reduction in viscosity compared with a comparative test in which no dispersing agent was used.

TABLE 7

| Example No. | Weight of Copolymer (grams) | Weight of NaCl (grams) | pH | Viscosity at 54 sec$^{-1}$ (poise) |
|---|---|---|---|---|
| 60 | 0.22 | 24.56 | 8.8 | 18 |
| 61 | 0.46 | 24.32 | 8.6 | 12 |
| 62 | 0.90 | 23.88 | 8.5 | 7 |
| C.T. | 0 | 24.78 | 8.9 | 24 |

C.T.: Comparative test.

EXAMPLES 63–74

These Examples illustrate dispersions of reactive dyes according to the present invention.

General Procedure

A mixture of 10 grams of press paste of a reactive dye, 10 grams of a solution of a neutralised copolymer in aqueous 3M sodium chloride solution, and 5 grams of 2 mm Ballotini beads in a vial was placed on a roller mill for 6 hours.

The viscosity of the resulting dispersion was measured on a Deer Rheometer at 20° C. at a constant stress.

TABLE 8

| Example No. | Reactive Dye | Dispersing Agent Prepared in Example No. | % w/w Copolymer in Mixture | Shear Stress (Dynes/cm$^2$) | Viscosity (Poise) |
|---|---|---|---|---|---|
| 63 | A | 16 | 0.5 | 72 | 7.1 |
| 64 | A | 16 | 1.0 | 72 | 6.6 |
| 65 | A | 17 | 0.2 | 72 | 4.6 |
| 66 | A | 18 | 0.2 | 72 | 4.6 |
| 67 | A | 19 | 0.2 | 72 | 24.8 |
| 68 | A | 9 | 0.2 | 72 | 12.9 |
| C.T. | A | | | 72 | 50–55 |
| 69 | B | 18 | 0.2 | 72 | 73.5 |
| 70 | B | 9 | 0.2 | 72 | 20.2 |
| C.T. | B | | | 72 | 80.7 |

TABLE 8-continued

| Example No. | Reactive Dye | Dispersing Agent Prepared in Example No. | % w/w Copolymer in Mixture | Shear Stress (Dynes/cm$^2$) | Viscosity (Poise) |
|---|---|---|---|---|---|
| 71 | C | 17 | 0.2 | 144 | 333 |
| 72 | C | 18 | 0.2 | 144 | 231 |
| 73 | C | 19 | 0.2 | 144 | 305 |
| 74 | C | 9 | 0.2 | 144 | 104 |
| C.T. | C | | | 144 | 489 |

C.T.: Comparative test.
A: Reactive Blue 160 as defined in the Colour Index in the form of a press paste of total solids content 42.7% w/w. (colouring matter 35.5% w/w, sodium chloride 7.2% w/w).
B: Reactive Red 2 as defined in the Colour Index in the form of a press paste of total solids content 54.6% w/w (colouring matter 39.6% w/w, sodium chloride 15.0% w/w).
C: Reactive Orange 12 as defined in the Colour Index in the form of a press paste of total solids content 43.5% w/w (colouring matter 33.0% w/w, sodium chloride 10.5% w/w).

The results are shown in Table 8 from which it can be seen that the viscosities of dispersions according to the present invention are significantly lower than the viscosities of the dispersions which contained no dispersing agents and were used in the Comparative Tests.

EXAMPLE 75

This Example illustrates a dispersion of a disperse dye according to the invention.

100 grams of an aqueous disperse dyestuff suspension comprising 10 grams of Disperse Green 9 as defined in the Colour Index, 1 gram of the copolymer prepared in Example 9, 4 grams of the sodium salt of a lignosulphonate derivative (low degree of sulphonation) and 85 grams of water were sand milled. A dispersion was obtained, after removal of the sand by suction, in which the majority of the dye particles were of a size less than 3 microns.

We claim:

1. In a dispersion in an aqueous medium of an organic particulate solid, substantially all the particles of which have a size less than 100 microns, which dispersion contains a polymeric composition which (a) is soluble in the aqueous medium and (b) comprises a copolymer of at least one hydrophobic monomer and at least one hydrophilic monomer, the improvement in which the said at least one hydrophobic monomer provides less than 20% by weight of the copolymer and is selected from the class consisting of long chain alkyl, containing 12 to 18 carbon atoms, or aryl esters of an acrylic or $C_{1-15}$-alkacrylic acid; vinyl-esters of a long chain alkanoic acids having 6–30 carbon atoms; and vinyl aromatic compounds and vinyl-ended macromers thereof, and the said at least one hydrophilic monomer provides more than 80% by weight of the copolymer and contains an acidic group and/or a salt thereof.

2. A dispersion as claimed in claim 1 wherein the acidic group is a carboxylic and/or a sulphonic acid.

3. A dispersion as claimed in claim 2 wherein the carboxylic acid is a mono-olefinic carboxylic acid having the general formula $$CH_2=\overset{R^6}{\underset{|}{C}}-CO_2H$$

wherein $R^6$ is a substituent selected from the class consisting of hydrogen, halogen, cyano, alkyl, aryl aralkyl, alkaryl or cycloaliphatic groups.

4. A dispersion as claimed in claim 3 wherein the carboxylic acid is acrylic acid.

5. A dispersion as claimed in claim 1 wherein the said hydrophobic monomer is lauryl methacrylate, α-methyl-styrene, vinyl stearate, α-methyl-styrene macromer, a 1- or 2-naphthyl methacrylate, or vinylnaphthalene.

6. A dispersion as claimed in claim 1 wherein the organic particulate solid is an organic pigment or dye.

7. A dispersion as claimed in claim 6 wherein the dye is a reactive dye as defined in the Colour Index.

8. A dispersion as claimed in claim 1 wherein the aqueous medium comprises a concentrated electrolyte solution.

9. A dispersion as claimed in claim 8 wherein the electrolyte is sodium chloride.

10. A process for the production of a free-flowing powder which comprises an organic dye or pigment which process comprises at least the step of evaporating to dryness a dispersion of the organic pigment or dye in an aqueous medium containing as dispersing agent a copolymer as defined in claim 1.

* * * * *